Sept. 21, 1943.　　　G. W. SCHATZMAN　　　2,329,946
LOCKING ASSEMBLY FOR AUTOMOBILE WHEELS AND PARTS THEREOF
Filed Feb. 6, 1942　　　2 Sheets-Sheet 1
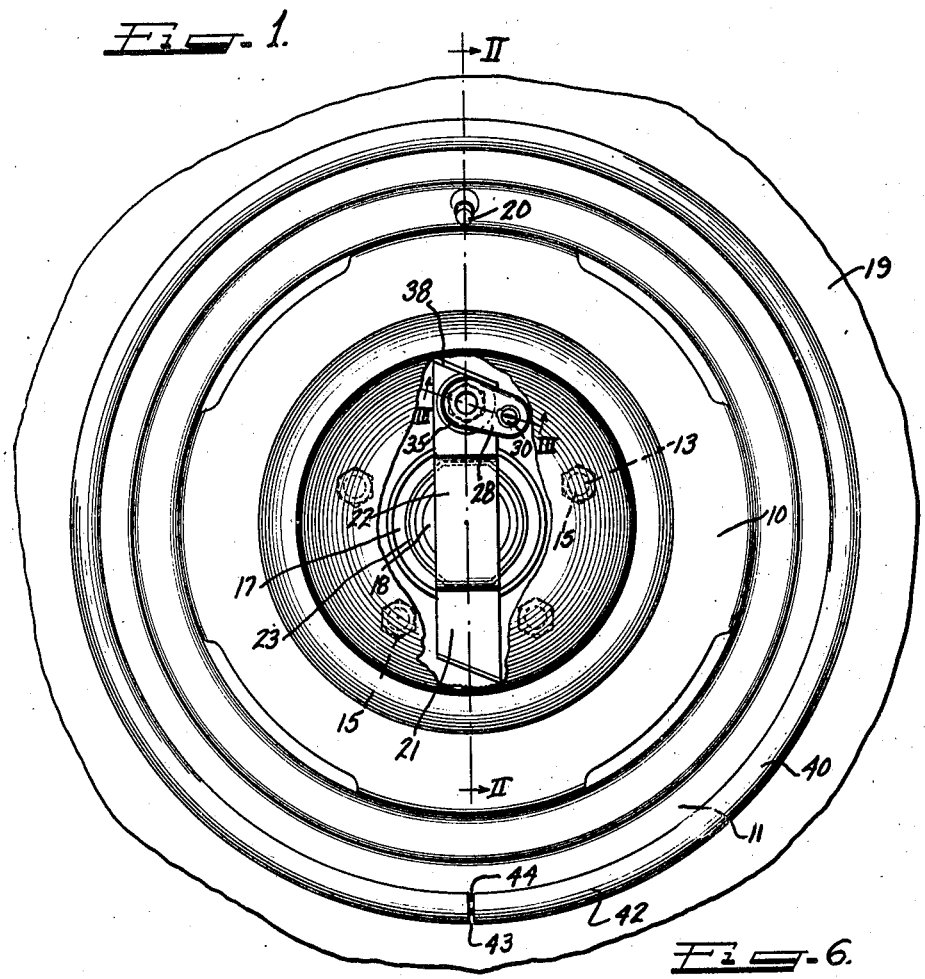
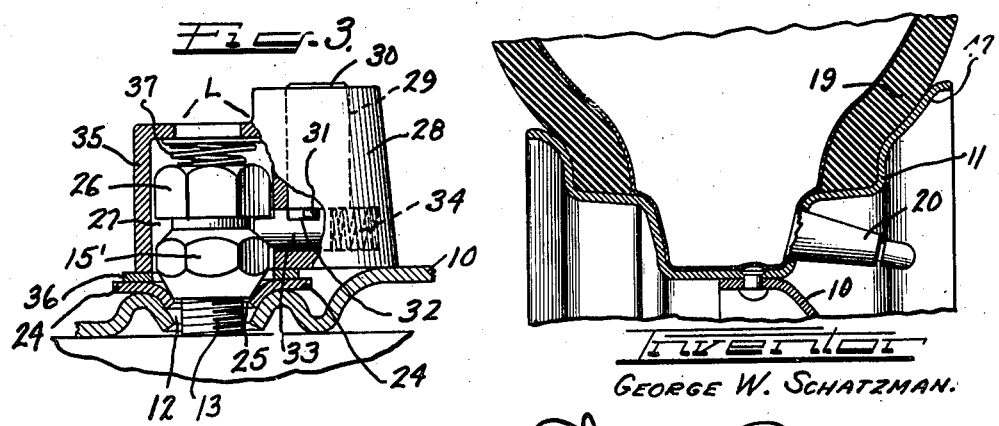
Inventor
GEORGE W. SCHATZMAN.

Sept. 21, 1943.  G. W. SCHATZMAN  2,329,946
LOCKING ASSEMBLY FOR AUTOMOBILE WHEELS AND PARTS THEREOF
Filed Feb. 6, 1942  2 Sheets-Sheet 2
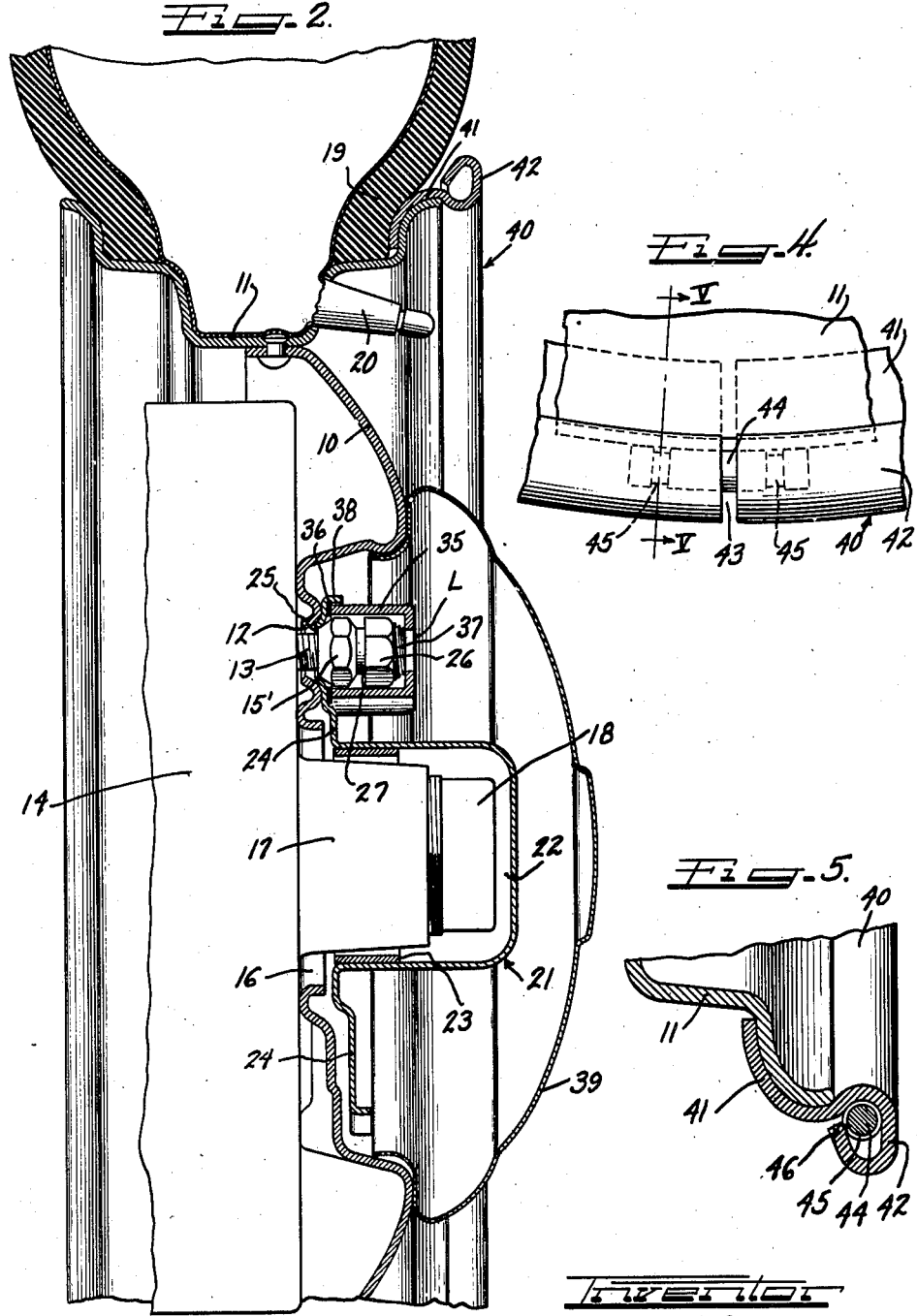
Inventor
GEORGE W. SCHATZMAN.

Patented Sept. 21, 1943

2,329,946

UNITED STATES PATENT OFFICE 2,329,946

LOCKING ASSEMBLY FOR AUTOMOBILE WHEELS AND PARTS THEREOF

George W. Schatzman, Detroit, Mich., assignor to Houdaille-Hershey Corporation, Detroit, Mich., a corporation of Michigan Application February 6, 1942, Serial No. 429,774

2 Claims. (Cl. 70—259)

My invention relates to a locking assembly for automobile wheels and parts thereof, the general object being to provide simple locking means which can be easily installed on cars to frustrate the theft of wheels and parts thereof.

More specifically, the object of the invention is to provide locking means effective to frustrate detachment of a wheel from its hub for removal of the entire wheel structure from the axle spindle, or the removal of the tire from the wheel rim.

The various features of my invention are embodied in structure shown on the drawings, in which:

Figure 1 is an outer side elevation, partly broken away, of a wheel to which my invention is applied;

Figure 2 is an enlarged section on plane II—II of Figure 1;

Figure 3 is an enlarged section on plane III—III of Figure 1;

Figure 4 is an enlarged side view of the end portion of a tire locking ring;

Figure 5 is a section on plane V—V of Figure 4; and

Figure 6 is a section similar to Figure 2 showing a modified arrangement for tire locking.

The wheel assembly shown on Figure 2 is of a well known type, the wheel comprising the disk 10 supporting the rim 11, the inner portion of the disk having the holes 12 receiving the studs 13 extending from the brake drum 14 to receive nuts 15 for securing the disk to the wheel hub, the disk having the central opening 16 for passageway therethrough of the hub 17 which receives the wheel spindle extending from the axle structure, a hub cap 18 being usually provided for the end of the hub to cover the nut which holds the wheel to the spindle, the arrangement being well known in the art. The rim 11 supports the tire 19 having the inflation nipple 20 extending outwardly from the rim.

Describing now the locking assembly, a guard or locking element 21 is provided for the hub cap 18, the element shown being in the form of a strap having its central portion 22 deflected outwardly to form a recess for receiving the hub cap and the end of the hub, a ring 23 being secured in the open end of the recess, as by welding, to surround the hub. The ends 24 of the strap extend radially outwardly adjacent to the wheel disk 10, and one of these ends has the hole 25 therethrough for receiving one of the studs 13 by which the wheel is secured to the drum 14. The nut for this stud is designed especially to cooperate with a snap-on lock structure L. This special nut comprises the inner head 15' and the outer head 26 between which is the annular channel 27, the heads being polygonal for reception of a wrench or other tool, the inner head 15' engaging against the strap end 24 to secure this end and the corresponding portion of the wheel disk to the hub 14.

The lock structure L shown is of a well known type. It comprises the body 28 having the bore 29 for a tumbler barrel 30 rotatable by a key, the barrel at its inner end having the eccentric pin or cam 31 engageable in the slot 32 of a locking bolt 33 shiftable radially across the bottom of the bore 29 and urged outwardly by a spring 34.

The lock body 28 has the extension 35 in the form of a cap coaxial with the body and adapted to receive the special nut. When the lock structure is slipped on over this nut, the beveled end of the lock bolt 33 engages with the nut outer head 26 to be shifted inwardly against the resistance of the spring 34 until the end of the bolt reaches the channel 27, when the spring snaps the end with its bolt into the channel so as to lock the lock body against removal from the nut, as clearly shown on Figure 3. A suitable washer 36 is interposed between the lock body and the strap end, and the cap part 35 has a spring 37 secured in its top end for abutting against the outer end of the nut to hold the lock structure against rattling.

To apply the lock structure, its cap 37 is merely slipped over the special nut until the lock bolt 33 is snapped into the channel 27 with its end behind the nut outer head 26. The nut structure is now enclosed by the lock structure and application of tools to the nut structure prevented so that removal of the guard or locking element 21 is frustrated for prevention of access to the hub cap 18 or the spindle nut for removal of the entire wheel structure from the spindle.

The engagement of the guard element 21 around the hub 17 and the securing of its end by the special nut will hold the element against rotational or other displacement. The end 24 of the strap terminates in an outwardly directed flange 38 for engaging along the side of the lock structure L to hold this structure against rotational displacement. The lock structure and the locking element 21 are enclosed by a cap or cover 39 detachably held to the wheel disk by friction or other means to keep out dust or dirt.

Means may also be provided for locking the tire against removal from the wheel or car. As shown, a locking ring 40 is provided of substantially ogee cross section, whose inner part 41 is of arcuate cross section to engage against the inner surface of the outer lip of the wheel rim, and whose outer part is deflected transversely into substantially tubular form 42. This ring has the transverse split 43 so that it may be opened and spiraled into position on the wheel rim, the adjacent ends of the tubular part 42 then receiving a locking pin 44 which at its ends has the channels 45 into which portions 46 of the ring are deflected so as to lock the ring closed and clamped and contracted against the rim. The outer tubular portion 42 of the ring extends radially beyond the outer lip of the rim a sufficient distance to prevent removal of the tire, even when deflated, in a direction outwardly from the wheel. Although the tire might be removed from the wheel in an inward direction, the tire would then surround the vehicle axis and could not be removed until the wheel disk is detached from the brake drum, or the hub structure with the wheel thereon is detached from the spindle, but such removal is frustrated by the nut structure which is locked by the lock structure L.

Instead of having a separate locking ring for application to the rim to prevent removal of the tire, the modified arrangement shown in Figure 6 may be used in which the outer lip is extended, as indicated at 47, a sufficient distance to prevent removal of the tire in a direction outwardly of the wheel.

I have thus provided a simple and efficient locking assembly for frustrating theft from an automobile of an entire wheel structure or parts thereof, but I do not desire to be limited to the exact structure and arrangement shown and described, as changes and modifications may be made without departing from the scope of the invention.

I claim as follows:

1. Locking means for an automobile wheel of the type in which the wheel has a sheet metal supporting disk apertured to receive threaded studs extending from a brake drum for engagement by nuts to secure the wheel, comprising a narrow sheet metal strap extending diametrically along the front of the wheel disk and having its middle portion deflected forwardly to U shape to extend along and close to the sides of the wheel hub and across the front of the hub cap, one end of said strap being apertured to receive one of the wheel supporting studs, the nut on said one stud having a locking recess, a lock structure for receiving and enclosing said nut and having a locking bolt engageable in said recess to hold said lock structure to the nut and having key operable means for releasing said bolt, and a reinforcing ring welded to the opposed inner sides of said strap at the inner end of said deflected portion to intimately receive the hub whereby to center the strap and hold it against radial displacement.

2. Locking means for an automobile wheel of the type in which the wheel has a sheet metal supporting disk apertured to receive threaded studs extending from a brake drum for engagement by nuts to secure the wheel, comprising a narrow sheet metal strap extending diametrically along the front of the wheel disk and having its middle portion deflected forwardly to U shape to extend along and close to the sides of the wheel hub and across the front of the hub cap, one end of said strap being apertured to receive one of the wheel supporting studs, the nut on said one stud having a locking recess, a lock structure for receiving and enclosing said nut and having a locking bolt engageable in said recess to hold said lock structure to the nut and having key operable means for releasing said bolt, and a reinforcing ring welded to the opposed inner sides of said strap at the inner end of said deflected portion to intimately receive the hub whereby to center the strap and hold it against radial displacement, the end of said strap adjacent said lock structure being deflected to form an abutment for preventing rotational displacement of the lock structure.

GEORGE W. SCHATZMAN.